United States Patent [19]
Shirochi

[11] Patent Number: 5,872,654
[45] Date of Patent: *Feb. 16, 1999

[54] PICTURE DISPLAY APPARATUS HAVING MULTIPLE DIFFUSING FILTER SURFACES

[75] Inventor: Yoshiki Shirochi, Chiba, Japan

[73] Assignee: Sony Corporation, Japan

[ * ] Notice: The term of this patent shall not extend beyond the expiration date of Pat. No. 5,621,487.

[21] Appl. No.: 652,349

[22] Filed: May 23, 1996

Related U.S. Application Data

[63] Continuation of Ser. No. 134,676, Oct. 12, 1993, Pat. No. 5,621,487.

[30] Foreign Application Priority Data

Oct. 19, 1992 [JP] Japan ................................ 4-306003

[51] Int. Cl.$^6$ ................ G02B 5/18; G09G 3/00
[52] U.S. Cl. .................. 359/566; 359/599; 359/619; 359/622; 345/32
[58] Field of Search ............... 349/112, 57; 348/290, 348/291, 292, 337, 833, 834, 835, 800; 345/32; 359/558, 559, 566, 599, 831, 619, 621, 622

[56] References Cited

U.S. PATENT DOCUMENTS

| | | | |
|---|---|---|---|
| 1,758,977 | 5/1930 | Rolph | 362/339 |
| 3,163,367 | 12/1964 | Bodian | 362/339 |
| 3,768,888 | 10/1973 | Nishino et al. | 359/576 |
| 3,910,683 | 10/1975 | Nishino et al. | 359/576 |
| 4,310,219 | 1/1982 | Jaccard | 359/599 |
| 4,472,735 | 9/1984 | Shinozaki et al. | 358/47 |
| 4,804,253 | 2/1989 | Stewart | 358/251 |
| 4,878,737 | 11/1989 | Ise | 358/44 |
| 4,989,959 | 2/1991 | Plummer | 359/640 |
| 5,005,968 | 4/1991 | Tejima et al. | 353/122 |
| 5,046,827 | 9/1991 | Frost et al. | 349/112 |
| 5,121,213 | 6/1992 | Nishioka | 358/213.11 |
| 5,237,452 | 8/1993 | Okayama et al. | 359/576 |
| 5,247,390 | 9/1993 | Hed | 359/599 |
| 5,322,998 | 6/1994 | Jackson | 250/216 |
| 5,621,487 | 4/1997 | Shirochi | 349/112 |

FOREIGN PATENT DOCUMENTS

| | | | |
|---|---|---|---|
| 0186166 | 7/1986 | European Pat. Off. | 359/566 |
| A 59-214825 | 12/1984 | Japan | G02F 1/133 |

*Primary Examiner*—Jon W. Henry
*Assistant Examiner*—John Juba, Jr.
*Attorney, Agent, or Firm*—Ronald P. Kananen

[57] ABSTRACT

A picture display apparatus is provided with a display device having pixels disposed in a mosaic pattern. A plurality of optical filter surfaces are respectively placed between the display device and a viewer so that both surfaces can be overlapped with each other. Each pixel in the display device is diffracted or refracted by both surfaces to become a plurality of pixels. For each optical filter surface, an element for diffusion such as a diffraction grating and an element for refraction such as a prism can be utilized for the diffraction and refraction.

3 Claims, 13 Drawing Sheets

FIG. IIA

FIG. IIB

PICTURE DISPLAY APPARATUS HAVING MULTIPLE DIFFUSING FILTER SURFACES

This application is a continuation of application Ser. No. 08/134,676 filed Oct. 12, 1993 now U.S. Pat. No. 5,621,487.

BACKGROUND OF THE INVENTION

1. Field of the Invention

This invention relates to picture display apparatus utilized with a display device such as a liquid crystal device (LCD) in which picture cells (pixels) are arranged in a mosaic pattern.

2. Background

In a picture display apparatus utilized with a display device such as an LCD in which pixels are arranged in a mosaic pattern, it is required to increase a number of pixels to increase resolving power of the apparatus. However, because the production yield of acceptable product is decreased, it is impossible to increase the number of pixels without limitation and make the space between pixels smaller.

When a large screen is made of this kind of picture display apparatus, a viewer may recognize dots of pixels or a grid based on the space between pixels (for example, a portion having black stripes an LCD). In a color picture display apparatus of this kind, color filters for the primary three colors or the corresponding three different colors are disposed in front of the pixels at a certain repeated frequency. However, when the screen becomes large, the frequency of pixel dots disposed with the same color filters can be easily recognized and therefore, lowers image quality.

For a charged coupled device (CCD) camera, it can become difficult to recognize the space between pixels by electronic process such as low pass filters. But, the electronic processes may not be available for making the pixel dots and the grid unrecognizable in the picture display apparatus such as the LCD display apparatus, because it is necessary to make up the space between pixels after a light is generated. As a compromise, there is a method to unfocus the viewer's lens focus. However, it does not result in a preferable condition, because the signal is also unfocussed.

A technique to render it difficult to recognize the grid between pixels has been developed, as described for example in a Japanese laid-open patent application Sho 59-214825. In the apparatus, a diffraction grating is placed in front of the display device such as a LCD. A light from a pixel is diffracted into a plurality of lights so that an image of a pixel can be focussed on a viewer's retina as a plurality of virtual images out of a plurality of pixels. The diffusion of pixel is so performed that the focussed position of diffracted image can be located on the grid position between the pixels. As the result, the grid between the pixels can become difficult to recognize.

Figure 13:
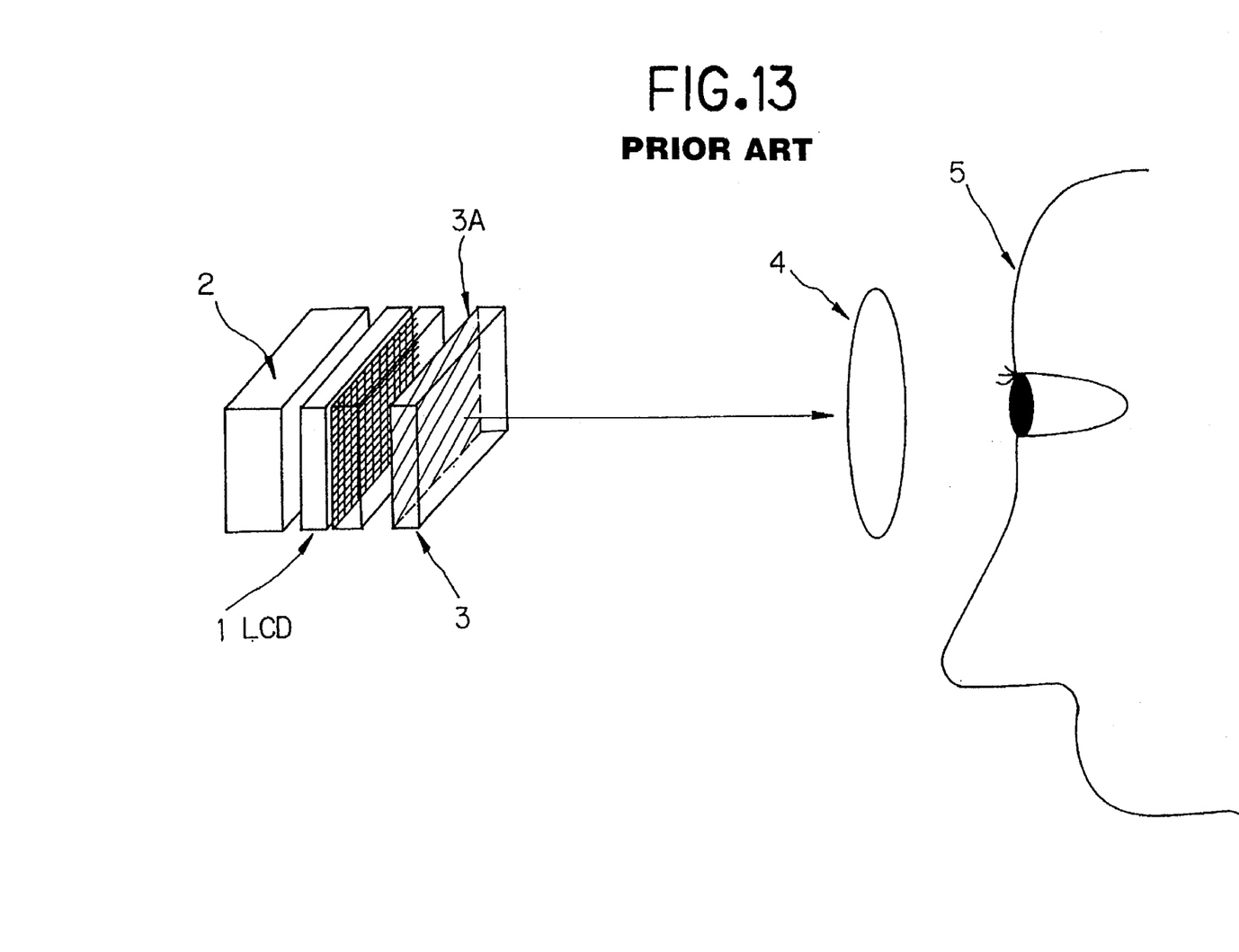
FIG. 13 shows an example of the conventional picture display apparatus.

FIG. 13 shows an example of the conventional picture display apparatus. An LCD 1 has a plurality of pixels placed along directions of height (column) and width (row). A back light member 2 is provided to provide a light from behind and make the display at the LCD 1 bright. An ocular lens 4 is disposed in front of the eyes of a viewer 5. A diffuser 3 (optical filter) is placed between the LCD 1 and the ocular lens 4. The diffuser 3 is formed by a transparent plate which has a diffraction grating 3A on its surface working as an optical filter surface for image diffusion.

Figure 14:
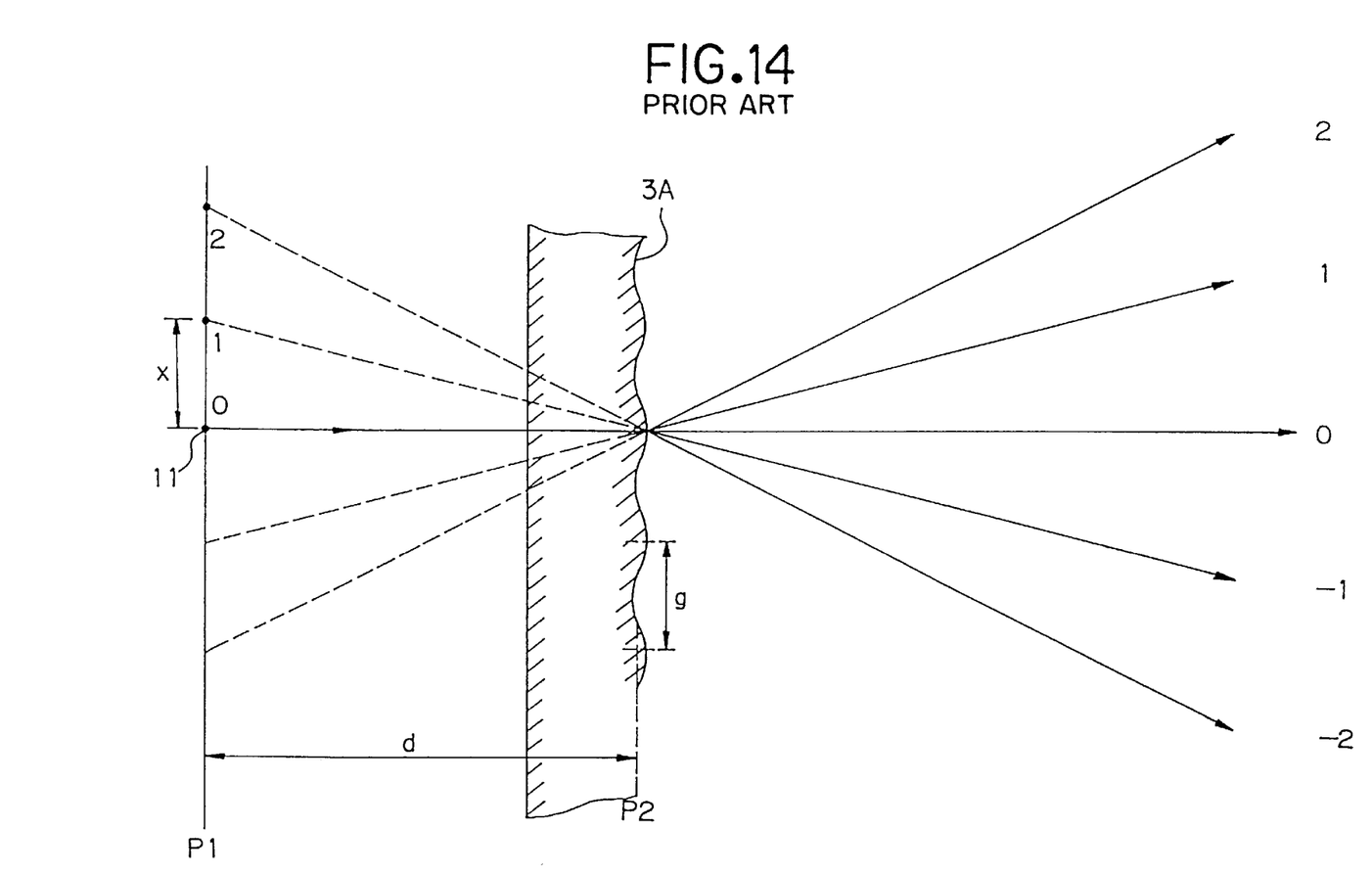
FIG. 14 shows an analogy of how a pixel is diffracted by a diffraction grating.

FIG. 14 is a drawing to explain the dispersion of light out of a pixel through the diffraction grating. In this drawing, a pixel 11 shows, for example, one of a plurality of pixels in the LCD 1. A diffraction grating 3A works as an optical filter surface. The diffraction grating 3A is disposed at a position P2 which has a distance d away from a position PI where the pixel 11 is located on the surface of the LCD.

As shown in FIG. 14, light from the pixel 11 is diffracted by the diffraction grating 3A. As an image of the pixel 11, the viewer of this apparatus can see a zero order image which goes straight through the diffraction grating 3A, and virtual images of 1st and 2nd orders at positions each shifted by a distance X which is determined by a pitch g of the diffraction grating 3A and the distance d. By designing to make these virtual images of 1st and 2nd orders overlap at the outlined portions between pixels, it becomes difficult to recognize the dots of the pixels and the grid between the pixels.

However, there has been some as described below in the conventional picture display apparatus because the optical filter surface for the picture diffusion is formed as a single surface.

In the conventional technique, it has been difficult to control the diffusion for more than three (3) pixels. In other words, with the diffraction grating 3A, it is difficult to control the luminance level of the diffracted light in the higher order. Also, a total number of images of the diffused pixels can not be easily increased because of the diffusion by a single optical filter surface. The directions obtained by the diffusion with a single optical filter surface have been also limited up to two (2) axes which is perpendicular to each other. Since there are no flexibility to design the apparatus due to the above reasons, the most appropriate image cannot be obtained by the pixel diffusion.

SUMMARY OF THE INVENTION

It is an object of the invention to provide a picture display apparatus in which the diffusion for more than three (3) pixels can be easily obtained.

It is another object of the invention to provide a picture display apparatus in which the directions by diffusion can be easily increased in more than three (3) axes directions.

These and other objects, advantages and features of the invention will become apparent to those skilled in the art upon consideration of the following description of the invention.

Figure 1:
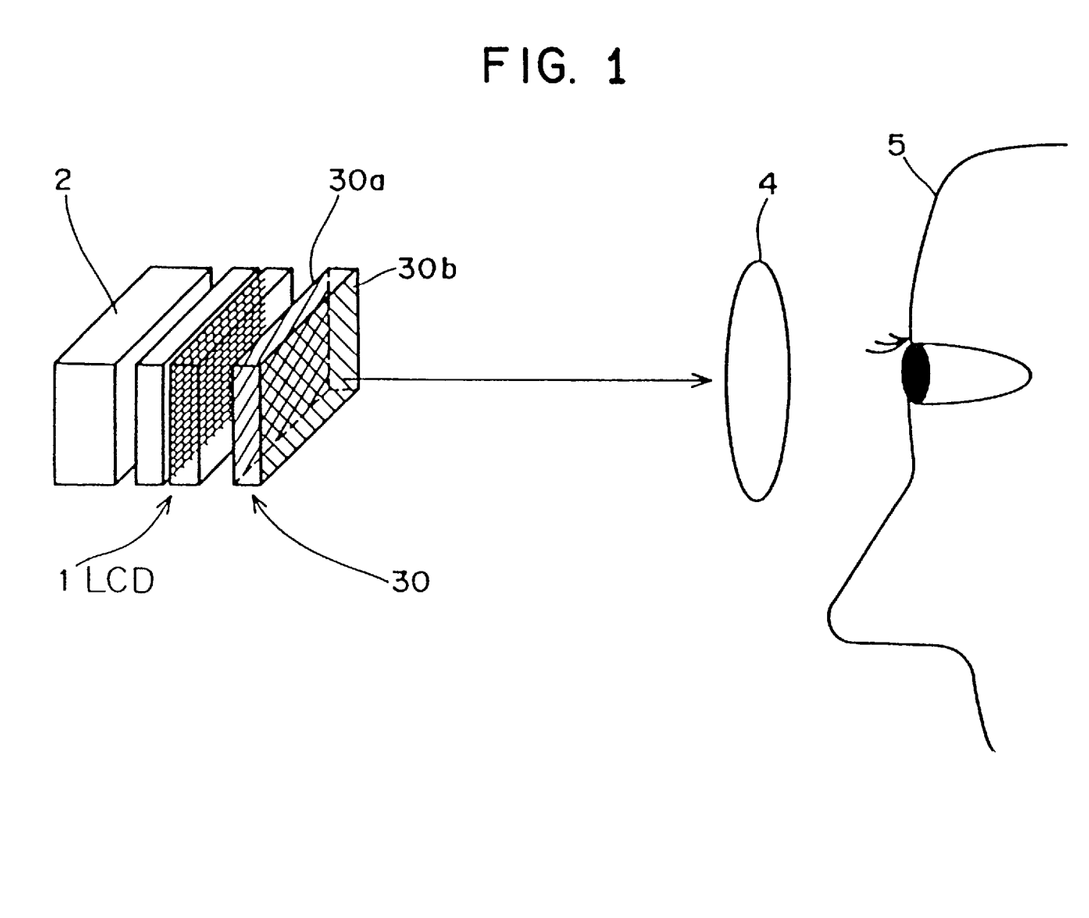
FIG. 1 shows a picture display apparatus as an embodiment of the invention.

In one aspect of the invention, a picture display apparatus is provided with a display device 1 having pixels disposed in a mosaic pattern. A plurality of optical filter surfaces 30a, 30b are respectively placed between the display device 1 and the viewer 5 so that both surfaces can be overlapped with each other. Each pixel image in the display device 1 is diffracted or refracted by both surfaces to become a plurality of pixel images. As each optical filter surface, an element for diffusion such as a diffraction grating and an element for refraction such as a prism can be utilized for the diffraction and refraction.

In accordance with the present invention, each pixel image in the display device is diffracted by the first optical filter surface 30a. Images of a plurality of pixels obtained by the diffusion at the first optical filter surface 30a is further diffracted by the second optical filter surface 30b. Depending on the number of the optical filter surfaces for pixel diffusion, the diffusion can be repeated and therefore, the number of the diffracted pixels can be increased. At the same time, by making directions of diffusion different to each other among the plurality of optical filter surfaces, the directions of diffusion can be easily increased in more than three (3) axes directions.

DESCRIPTION OF THE INVENTION

FIG. 1 shows a picture display apparatus as an embodiment of the invention, having the same reference numeral as used in FIG. 13 to identify the common portions.

Figure 2:
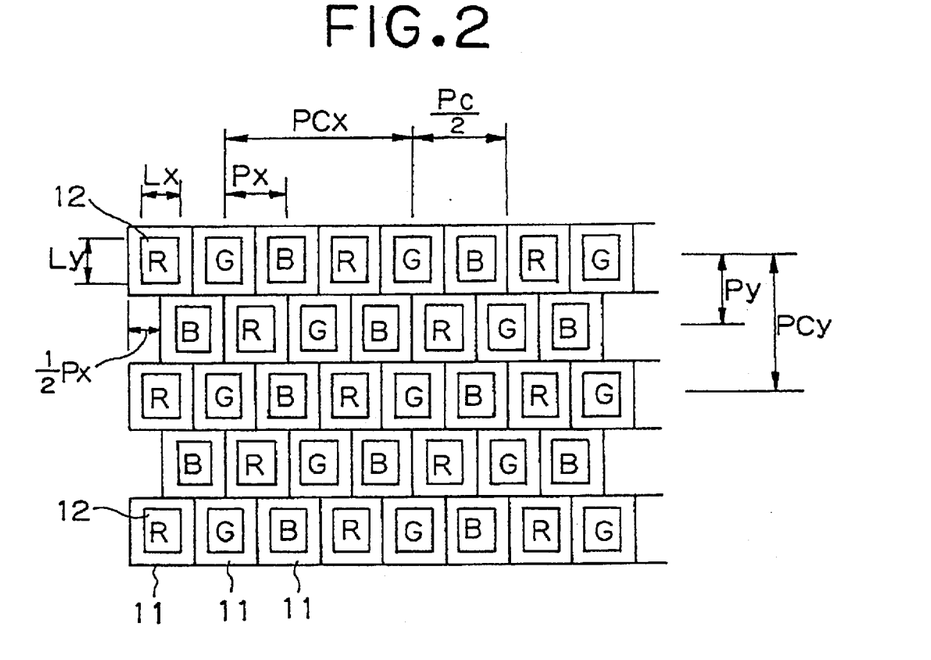
FIG. 2 shows an example of arrangement for color pixels in a color picture display apparatus of the invention.

As shown in FIG. 2, an LCD 1 of this embodiment has a plurality of pixels 11 placed along directions of height (column) and width (row). Each pixel 11 has an opening 12 which is substantially brightened. This opening 12 has a length Lx in the row direction and a length Ly in the column direction. Pitches between the pixels in this embodiment are Px in the row direction and Py in the column direction. The location of each of the pixels in every adjacent row are deviated by a ½ of a pixel pitch (Px/2) in the row direction.

This example is utilized in a color picture display apparatus. Color filters corresponding to three primary colors are placed relative to each pixel 11. In this example, each pixel 11 radiates either one of red (R), green (G) or blue (B) color light. In each row, pixels 11 are arranged so that a set of three colors can be repeatedly disposed such as R, G, B, R, G, B, - - - . A pitch between the same color is PCx (=3Px) in the row direction. At every two rows, the same color pixels 11 are aligned to each other in the same column. A pitch along the column direction between the same color pixels at the every two rows is PCy (=2Py). The location of the same color pixels in every adjacent rows are deviated by a ½ of a pixel pitch having the same color (Pc/2). As the result, the same color pixels are arranged in a mosaic pattern.

As shown in FIG. 1, two optical filter surfaces 30a and 30b are placed to overlap with each other between the LCD 1 and the ocular lens 4. These optical filter surfaces 30a and 30b shown by oblique lines are parallel, face each other, and are formed on a transparent plate so as to form the diffuser 30.

The optical filter surfaces are structured by groups of small prisms or the previously explained diffraction grating. Since the image formed by the diffracted pixels has already been explained, the optical filter surface formed by the groups of small prisms will be explained below.

Figure 4:
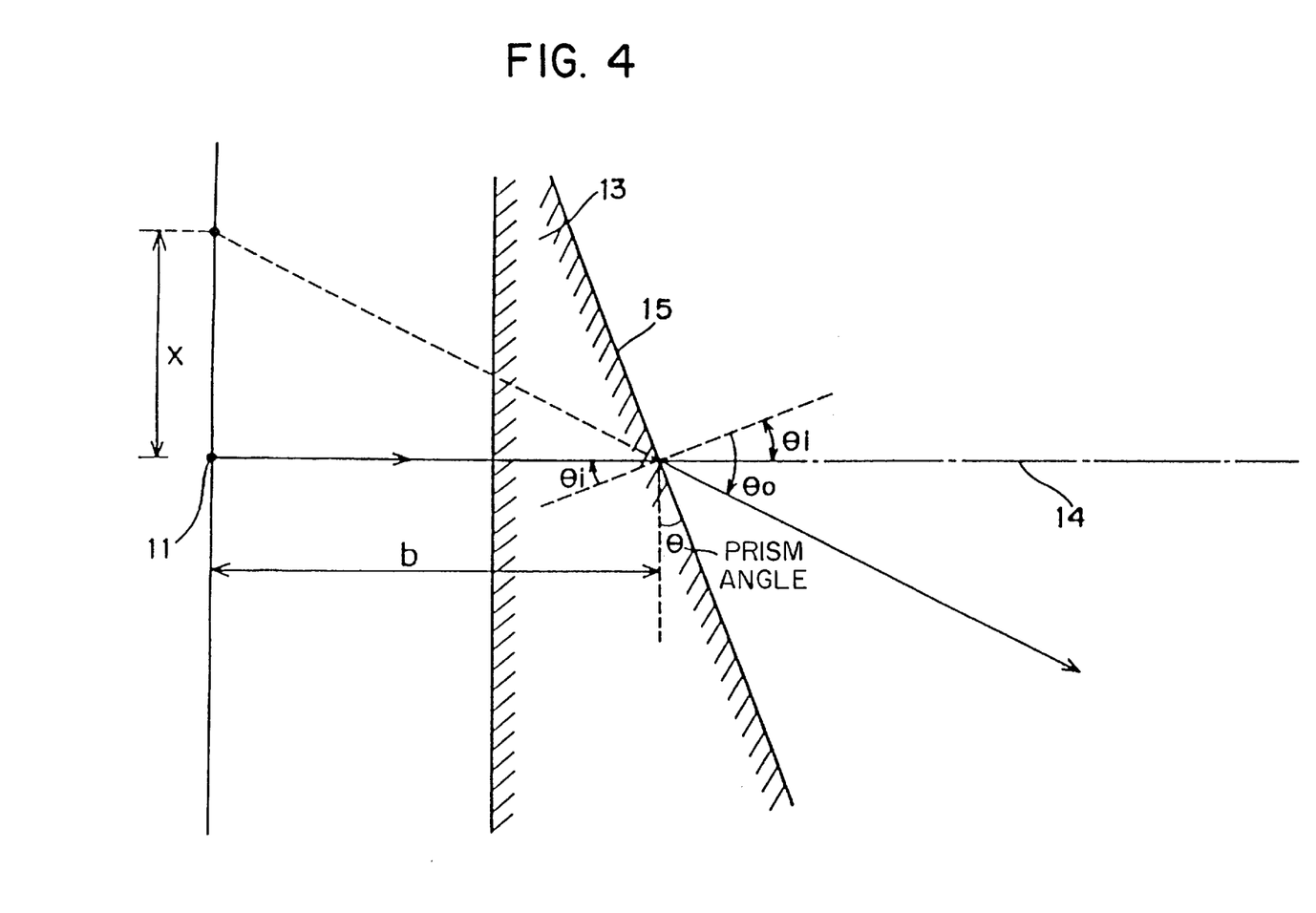
FIG. 4 shows how an image of a pixel can be shifted by a prism.

FIG. 4 is illustrated to explain the shifted image. In this drawing, a prism 13 has an angled surface 15. The angle 0 is referred to as a prism angle formed in a direction which is perpendicular to an optical axis 14.

Light derived from a pixel 11 enters into the prism 13 through the angled surface 15 with an incoming angle (incident angle) $\theta i$. The light is refracted and exits from the prism 13 with an outgoing angle $\theta o$. Therefore, a viewer can see a virtual image at the position which is shifted with a distance X from the original position of pixel 11.

The refractive index N of the prism 13 can be given by an equation as follows.

$$N * \sin \theta i = \sin \theta o \quad [1]$$

The shifted distance X can be given when the distance is b between the pixel 11 and angled surface 15.

$$X = b * \tan(\theta o - \theta i) \quad [2]$$

Since $\theta i = 0$, the shifted distance X can be determined without regard to a formed pitch of prism, as follows.

$$X = \tan(\sin^{-1}(N * \sin 0) - 0) \quad [3]$$

Therefore, the moire fringes can be easily decreased by adjusting pitches between a plurality of small prisms.

When the diffraction grating is utilized, the shifted distance X can be determined by the distance d between the pixel and diffraction grating and the pitch g of diffraction grating as previously mentioned. It can be given by the following equation when λ represents a wavelength of light.

$$X = \lambda * d / g \quad [4]$$

The most appropriate shift distance is determined by the pixel arrangement of the LCD. Therefore, as understood by equation 4, the pitch g could be automatically determined when the diffraction grating is mounted at a certain location which is the distance d away from the LCD. In other words, there is no freedom to choose the pitch g. It becomes difficult to decrease the moire fringes when a diffraction grating is utilized for a color display apparatus. This problem can be avoided when the prism is utilized.

Further, with the diffraction grating, the luminance intensity of a diffused image becomes low as its order becomes high. Also, it is difficult to control its luminance level. The dispersed lights in high orders, which are unnecessary, may cause an undesired decrease of its contrast. In other words, the diffused image in high orders cannot be practically utilized. However, by combining a plurality of diffraction gratings, diffraction lights in only lower orders can be utilized so as to obtain the equivalent effect as obtained by diffusion images in higher orders.

When the optical filter surface is utilized with a prism, the shifted images can be obtained in accordance with the number of angled surfaces each of which has a different prism angle. The intensity of dispersed lights by angled surfaces can be determined by its solid angle of the angled surface. It is possible to equalize the intensity of a plurality of dispersed lights by controlling the solid angles. The construction of a small prism can be simplified by utilizing a plurality of optical filter surfaces.

As described in greater detail later, the desired number and directions of diffusion can be obtained by combining a plurality of optical filter surfaces with diffraction gratings and small prisms.

Figure 3:
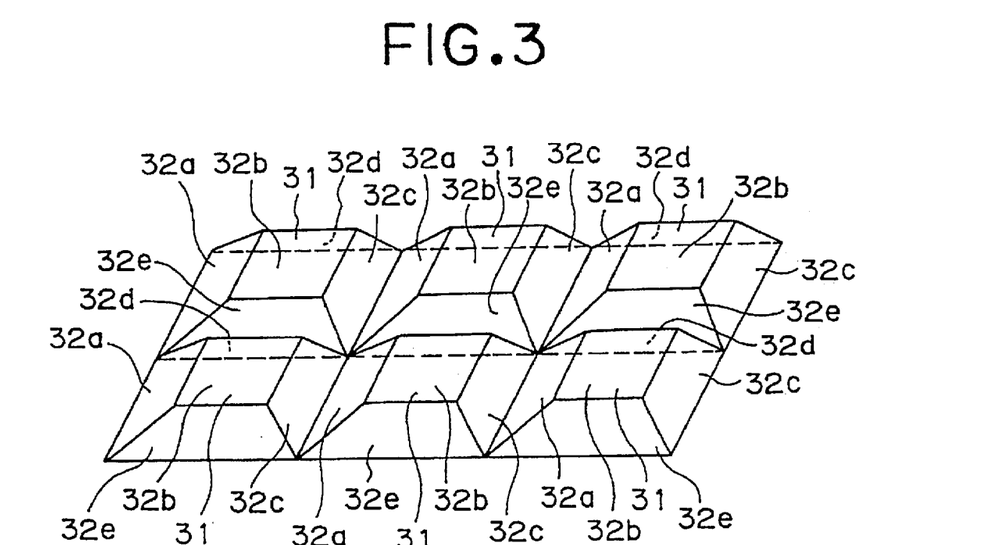
FIG. 3 is a partially enlarged drawing showing an example of an optical filter surface of the invention.

FIG. 3 is a partially enlarged drawing for showing a plurality of small prisms 31 formed on a surface. In this example, each of the small prism 31 has angled surfaces 32a, 32b and 32c having three different prism angles in a direction along a row on a display surface of LCD 1. Each also has angled surfaces 32d, 32b and 32e having three different prism angles in a direction along a column. Each of the small prisms thus have a shape of a truncated pyramid having three different angled surfaces in each direction along a row and a column.

Figure 5:
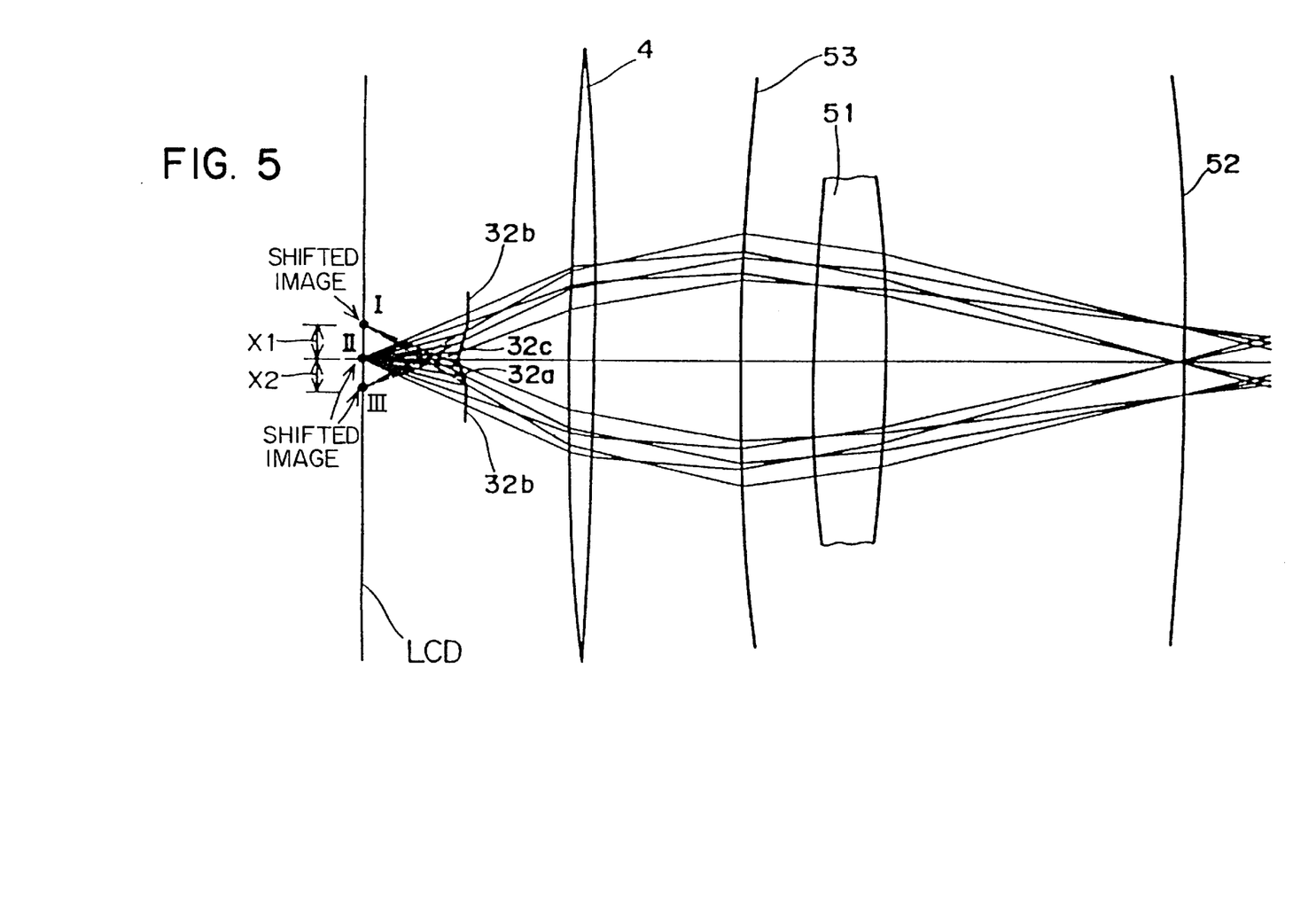
FIG. 5 shows an analogy as to how the images of a pixel are shifted by the optical filter surface formed with groups of small prisms.
Figure 6:
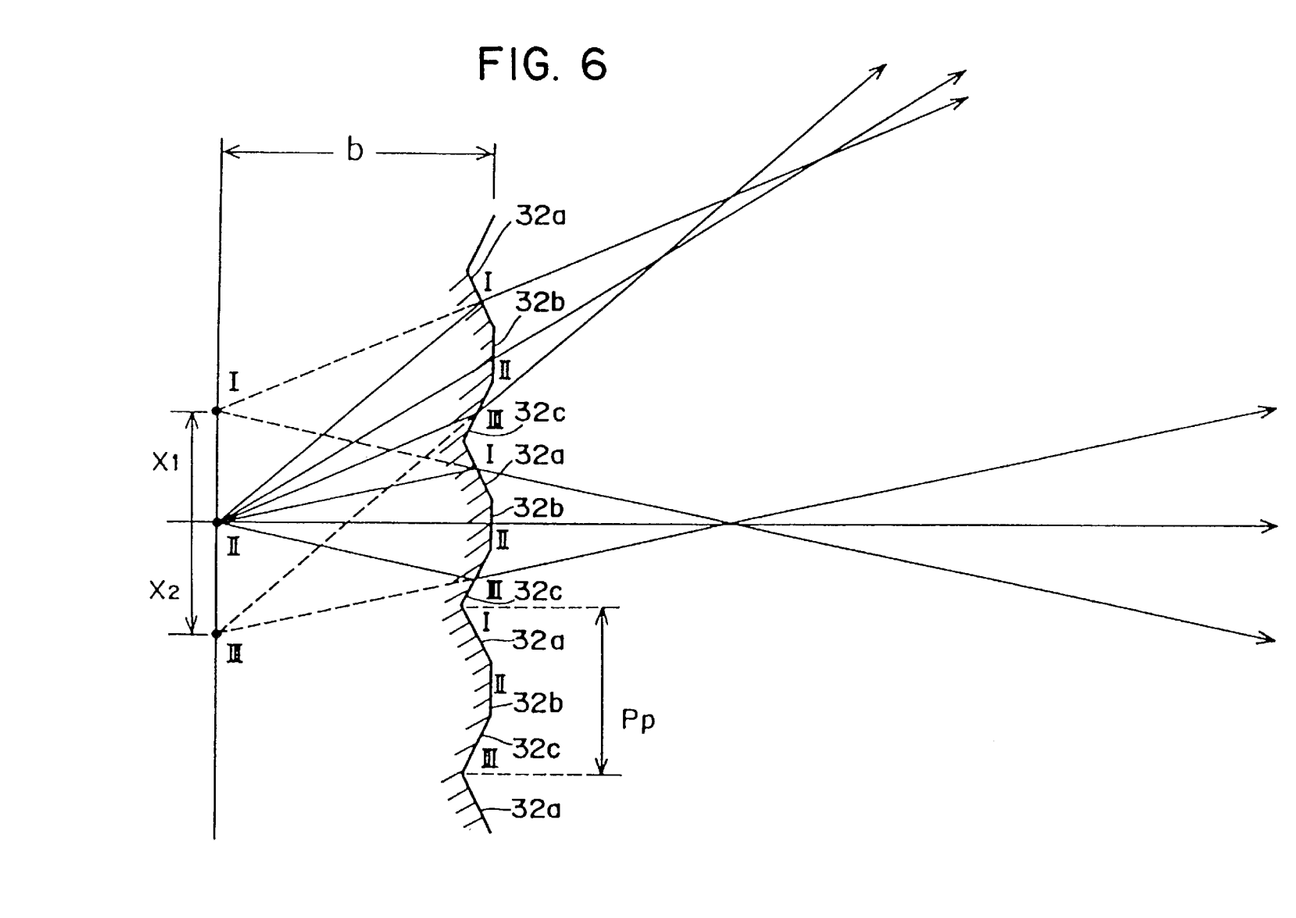
FIG. 6 is a partially enlarged drawing of FIG. 5.

In this example, light from a pixel 11 of an LCD 1 can be diffused into three images in each direction along a row and a column by the angled surfaces of the small prism 31 with three different prism angles respectively in row and column directions. Therefore, nine (9) images can be obtained by the three times three (3×3) number of diffusions of a pixel image. FIG. 5 shows that a group of small prisms generates shifted images of a single pixel in accordance with the number of different prism angles. FIG. 6 is an enlarged drawing showing a portion of the small prisms in FIG. 5. In these drawings, three images composed three pixel diffusions can be realized by utilizing the angled surfaces 32a, 32b and 32c each of which respectively has three different prism angles in a direction such as a row. In FIG. 5, rays are focussed at the same positions on a retina so far as they are passed through the same angled surface having the same prism angle in the small prisms group.

The outgoing rays from angled surfaces of a small prism are extended toward the pixel by dotted lines in FIG. 6 so that three positions (as shown by I, II and III in FIGS. 5 and 6) of the shifted images can be determined. In this embodiment, there are three different shifted distances 0, X1 and X2. In other words, a single shifted image can be expected with respect to each of the angled surfaces. By adjusting a solid angle from a pixel to each of the angled surface and controlling the area of the angled surfaces, the intensity of light (luminance) of each shifted image (diffusion image) can be controlled corresponding to each angled surface.

To simply explain the principle of this invention, only a direction along a row (i.e., in an X axis direction) needs to be considered in FIGS. 7A to 7J. These drawings explain an example as to how the spatial grid becomes difficult to recognize so as to improve the resolution as the number of pixel diffusions increase. In this example, the diffusion images are controlled to have the same luminance.

Figure 7A:
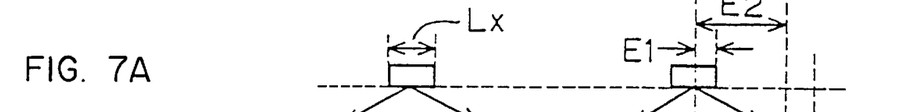
FIGS. 7A to 7J show how pixels are diffracted, resolution is improved and also how a grid becomes unrecognizable.
Figure 7B:
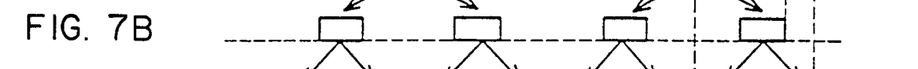
Figure 7C:
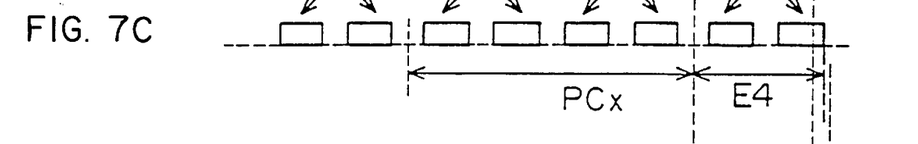
Figure 7D:
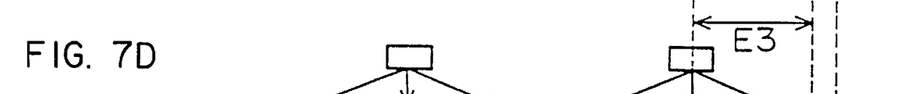
Figure 7E:
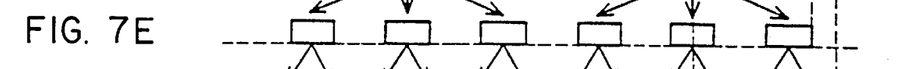
Figure 7F:
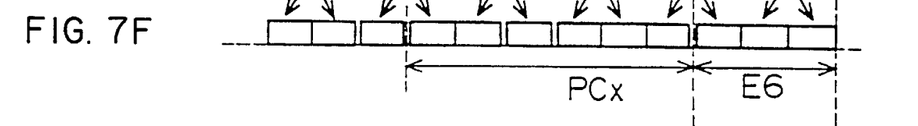
Figure 7G:
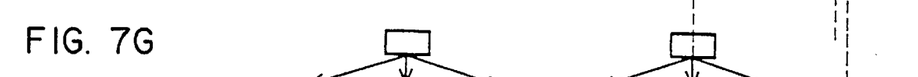
Figure 7H:
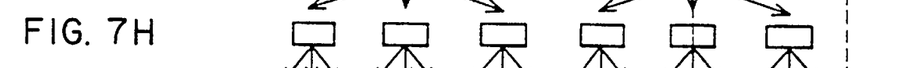
Figure 7I:
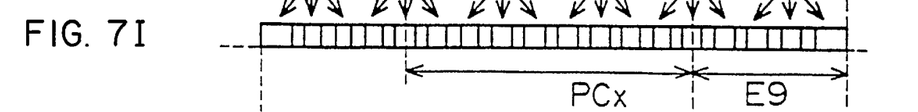

FIGS. 7A, 7D and 7G respectively show the original positions of pixels along the X axis, each of which has the same color. In other words, each adjacent two pixels are shown in the case of a black and white display device. However, in the case of a color display, a blue pixel (B) and a red pixel (R) will be further disposed, among the green pixels (G) shown in the drawings, with an interval of one third (⅓) of the color pitch PCx. FIGS. 7B, 7E and 7H show the diffusion images obtained through the optical filter surface 30a shown in FIG. 1. FIGS. 7C, 7F and 7I show the diffusion images obtained through the optical filter surface 30b. In all of the drawings, the vertical axis shows a luminance level and the horizontal axis shows a distance between spatial positions.

FIG. 7B shows the result of two pixel diffusions by the optical filter surface 30a of a small prism in which the shifted distances are ±PCx/4. FIG. 7C shows the result of two pixel diffusions by the optical filter surface 30b of a small prism in which the shifted distances are ±PCx/8. In total, four (4) pixel diffusions can be obtained.

FIG. 7E shows the result of three pixel diffusions by the optical filter surface 30a of a diffraction grating or a small prism in which the shifted distance are ±PCx/3 and 0. FIG. 7F shows the result of two pixel diffusions by the optical filter surface 30b of a small prism in which the shifted distance are ±PCx/12. In total, six (6) pixel diffusions can be obtained. As the result, the gaps between pixels are almost filled so that the grid as such can become difficult to recognize.

FIGS. 7H and 7I respectively show the result of three pixel diffusions by the optical filter surface 30a of a diffraction grating or a small prism in which the shifted distance distances are ±PCx/3 and 0, and the result of another three pixel diffusions by the optical filter surface 30b of a diffraction grating or small prism in which the shifted distances are ±PCx/9. In total, nine (9) pixel diffusions can be obtained.

Figure 7J:
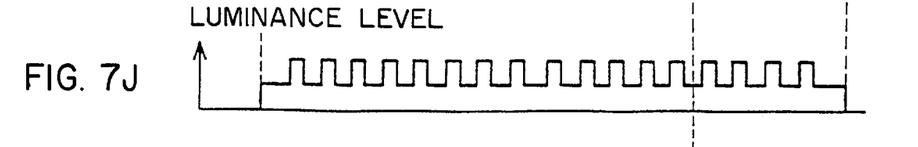

In these nine (9) pixel diffusion. A variation appears in the luminance level due to the overlapped portion of the diffusion images as shown in FIG. 7J.

Now, the distance between the center of pixel and the edge of displayed image is defined as an edge blurred distances (El~E9) as seen in FIGS. 7A and 7I respectively. When the number of pixel diffusions is small, the blurred distance is also small and a sharper image can be displayed. However, the effect of human eyes as a low pass filter may not be expected due to the larger displayed image. Therefore, an unbrightened portion between adjacent pixels can be recognized as a grid in a two dimensional display and it becomes uncomfortable when viewing the images.

Figure 8A:
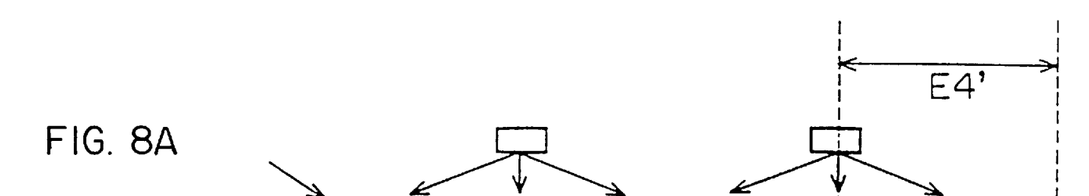
FIGS. 8A to 8D also show how pixels are diffracted, resolution is improved and also how a grid becomes unrecognizable.
Figures 8B, 8C:
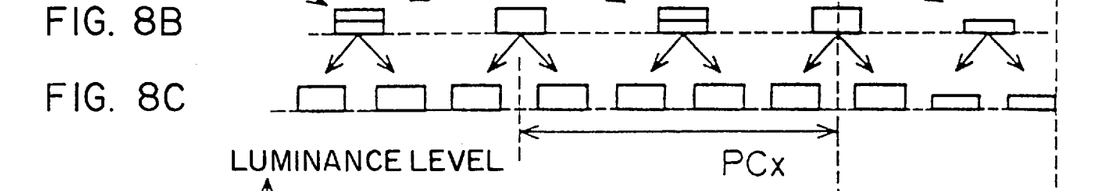
Figure 8D:
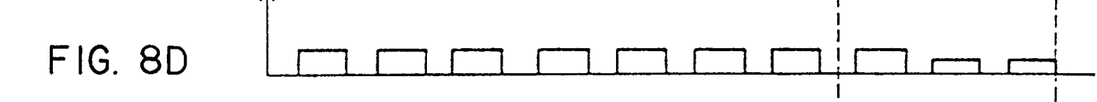

FIGS. 8A to 8D show another example of the pixel diffusion. FIG. 8A shows the result of three pixel diffusions by the optical filter surface 30a of a small prism, for example, in which the shifted distances are ±PCx/2 and 0. In this example, the luminance level of the diffusion images appearing at the ±PCx/2 shifted distance are one half (½) of the image at the 0 shifted distance. In other words, the luminance level of the diffusion images at the ±PCx/2 shifted distance becomes one (1) after the diffusion images from adjacent pixels are overlapped with each other. FIG. 8C shows the result of two pixel diffusions by the optical filter surface 30b of small prism in which the shifted distance are +PCx/8. In this example, four (4) pixels diffusion can be performed by two optical filter surfaces. However, compared with examples shown in FIGS. 7A to 7F in which all of the diffusion images have a luminance ratio of one to one (1:1), the example in FIGS. 8A to 8D has a longer blurred distance with a small number of diffusion pixels.

Considering with FIGS. 7A to 7J and 8A to 8D, the most appropriate conditions for pixel diffusion could be as follows.

For decreasing the unbrightened grid portion, it is better to: (1) diffuse images toward the location where the pitch between the same color pixels can be equally divided; and (2) make the number of diffusions.

For shortening the edge blurred distance greater, it is better to: (1) make the number of diffusion smaller; and (2) make luminance the level ratios after diffusions equal to each other. In the above conditions, the most appropriate value for the number of pixel diffusions may vary depending on a scaling factor for the image.

When the scaling factor for the image is large, it becomes uncomfortable with any grid. At this time, among the examples shown in FIGS. 7A to 7J, the six (6) pixel diffusions shown in FIG. 7F could be the most appropriate example. As previously explained, the example can be obtained by first performing three(3) pixel diffusions by diffraction grating and then performing two (2) pixel diffusions by a prism. However, it can be also obtained by first performing two (2) pixel diffusions and then performing three (3) pixel diffusions.

The most appropriate number of diffusions for the shifted images can be calculated as follows, in case of color pixel arrangements shown in FIG. 2. In a direction along a row, it is the integer number obtained after rounding off the quotient which is the opening length Lx of a pixel divided by the pitch PCx. In a direction along a column, it is the integer number obtained after rounding off the quotient which is the opening length Ly of a pixel divided by the pitch PCy. In the case of a monochrome display, the most appropriate number of diffusion image can be also calculated as follows. In a direction along a row, it is the integer number obtained after rounding off the quotient which is the opening length Lx of a pixel divided by the pitch Px. In a direction along a column, it is the integer number obtained after rounding off the quotient which is the opening length Ly of a pixel divided by the pitch Py.

Considering equation 4 for diffraction grating and equation 3 for a prism, it is understood that the shifted distance X of a pixel can be maintained at a certain value by changing the pitch g of the diffraction grating or the prism angle θ0 even though the mounted locations of optical filter surfaces d and b may have different values.

The two (2) pixel diffusions cannot be realized only by a diffraction grating. The pixel diffusion cannot be easily realized either by a diffraction grating or a prism, having the number of diffusions more than three (3) pixels with the same luminance level ratio. In the examples described below, the most appropriate pixel diffusion can be obtained by utilizing a plurality of optical filter surfaces each of which causes less pixel diffusion. The visual sensitivity to recognize the configuration of a pixel edge and the spatial frequency characteristics of eyes are all variable with each individual. Therefore, it would be better to precisely determine the number of pixel diffusions and the shifted distance of a pixel by evaluating the actual images.

The examples of two dimensional pixel diffusion will be explained next with the drawings as a simulation.

Figure 9A:
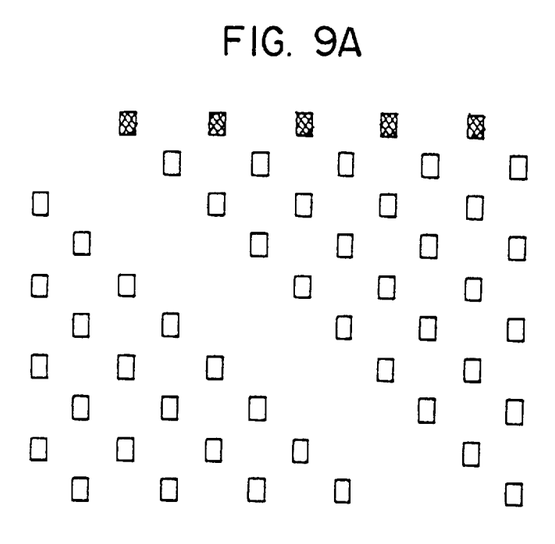
FIGS. 9A and 9B show an example of pixels disposed in a mosaic pattern and a pattern formed by diffracted pixels in two-dimensional directions.

FIG. 9A shows a two-dimensional-pixel-pattern of a display device, by which an arrangement for the same color pixels as mosaic pattern can be easily understood. To simplify the drawing, FIG. 9A only shows the pixels which have the same color though there are red pixels (R), green pixels (G) and blue pixels (B) arranged as shown in FIG. 2. Pixels in an oblique direction are intentionally omitted from the drawing to check the edges of pixels in an oblique direction after the diffusion.

Figure 9B:
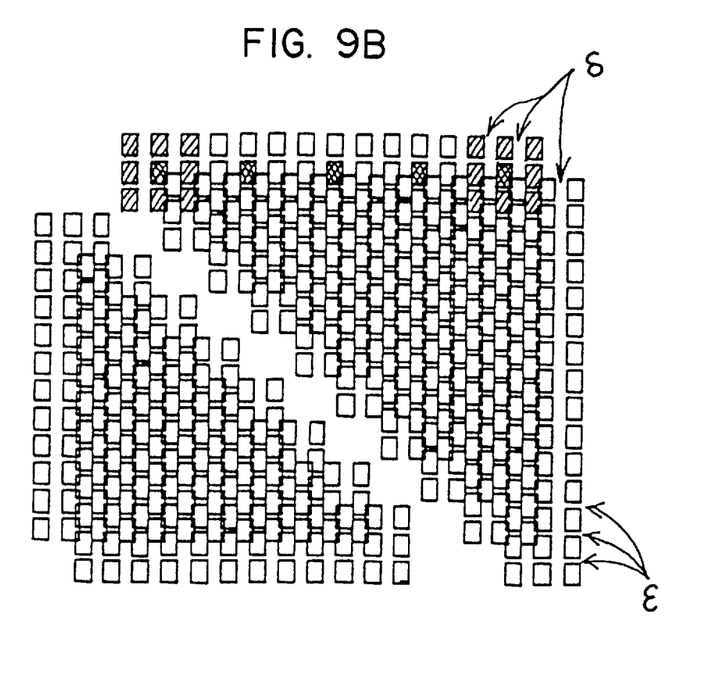

FIG. 9B shows the image pattern after three (3) pixel diffusions respectively in the X axis along a row and in the Y axis along a column. This pattern can be obtained by optical filter surfaces on small prisms arranged in two dimensional directions as shown in FIG. 3. For the purpose of comparison, the double hatched lines are partially added to represent the positions of the pixels in both FIGS. 9A and 9B and the single hatched lines are partially added to represent the diffusion pixels in FIG. 9B. As shown in FIG. 9B, unbrightened gaps δ and ε still exist around the edges of an image along the column and row directions. This may causes an uncomfortable fluffy image.

Figure 10:
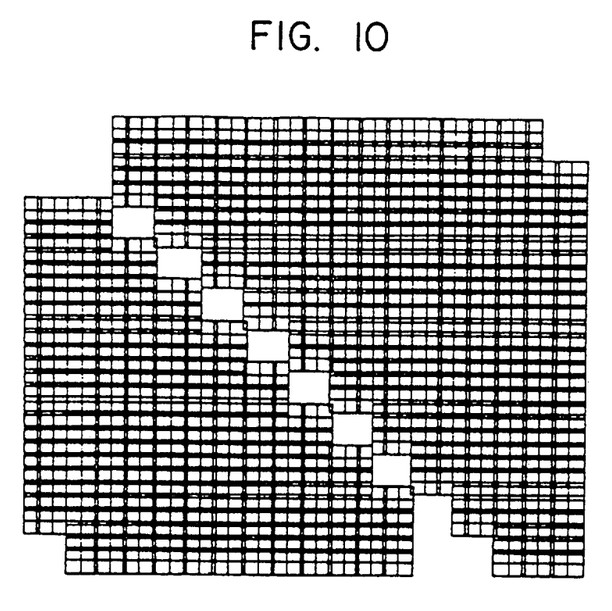
FIG. 10 shows another example of pixels disposed in a mosaic pattern and a pattern formed by diffracted pixels in two-dimensional directions.

FIG. 10 shows the image pattern after six (6) pixel diffusions respectively in the X axis along a row and in the Y axis along a column, therefore, becoming thirty six (36) pixel diffusions in total. The original pixel pattern is the same as shown in FIG. 9A. This example is equivalent to a two dimensional version of the one dimensional example shown in FIG. 7F. In this example, the optical filter surface 30a is made of the diffraction grating which causes three (3) pixel diffusions respectively along the X axis direction and Y axis direction. The optical filter surface 30b is made of the small prism group which causes two (2) pixel diffusions respectively along the X axis direction and Y axis direction. Alternatively, the optical filter surface 30a may be made of the small prism group which causes two (2) pixel diffusions respectively along the X axis and Y axis directions, and the optical filter surface 30b may be made of the diffraction grating which causes three (3) pixel diffusions respectively along the X axis and Y axis directions. Further, the optical filter surfaces 30a and 30b can be both made of the small prism group. As explained previously with the one dimensional example in FIG. 7F, there are few unbrightened portions remaining in this two dimensional example in FIG. 10. It is understood, therefore, this example has the most appropriate numbers of pixel diffusions.

Figure 11A:
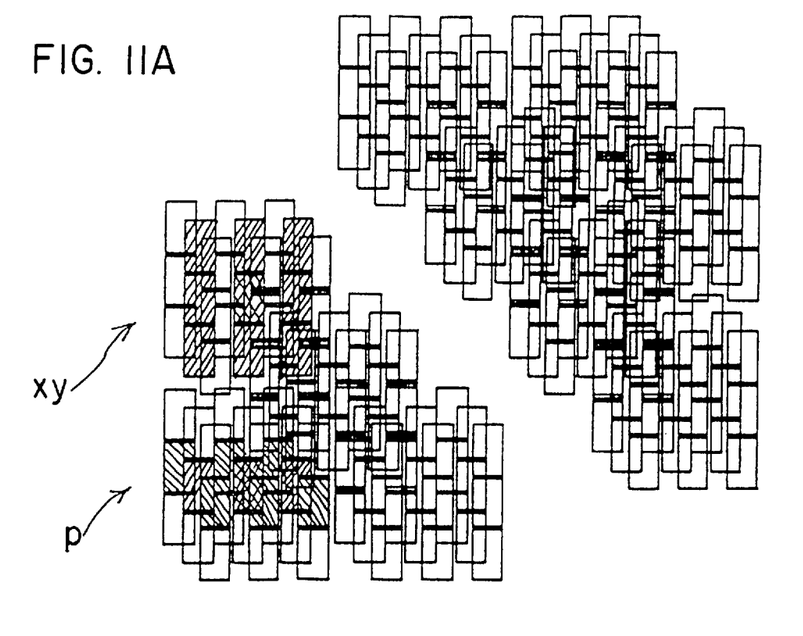
FIGS. 11A and 11B show a further example of pixels disposed in a mosaic pattern and a pattern formed by diffracted pixels in two-dimensional directions.
Figure 11B:
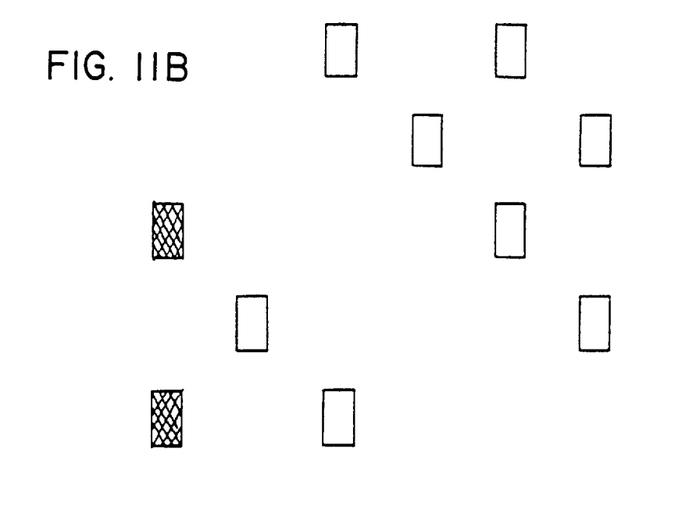

FIGS. 11A and 11B show another embodiment of the invention. In this example, one of the optical filter surfaces 30a and 30b is made of the diffraction grating or the small prism group so that three (3) pixel diffusions can be respectively performed along the X axis direction and the Y axis direction which are perpendicular to each other. Another of the optical filter surfaces 30a and 30b is made of the diffraction grating or the small prism group so that another three (3) pixels diffusion can be performed along another slanting direction which is different from the X axis and Y axis directions. In other words, by making the pixel diffusions along more than three axes, the configuration of image edges is varied so that the most appropriate pixel diffusion can be obtained.

Similar to FIGS. 9A and 9B, the double hatched lines are partially added to represent the positions of the pixels in both FIG. 11A and 11B and the single hatched lines are partially added to represent the diffusion pixels in FIG. 11A. As shown in FIG. 11A, the single hatched (upper right to lower left) images at the part XY are obtained by, for example, the optical filter surface 30a with respective three (3) pixel diffusions along the X-axis and Y-axis directions. Further, the other single hatched (upper left to lower right) images at the part P in FIG. 11A are obtained by, for example, the other optical filter surface 30b with a further three (3) pixel diffusions along a slanting (upper left to lower right) axis. As the result, the image pattern includes twenty seven (27) diffusion images in total out of a pixel. FIG. 11B shows the original pixel pattern before the pixel diffusion. FIG. 11B has the same pattern arrangement as shown in FIG. 9A but shows a part of it corresponding to FIG. 11A.

By adding the further shift along the slanting axis, the pixel diffusion along the X-axis and Y-axis directions can be adjusted so as to make the shifted distance of pixel shorter and avoid the worse resolution.

Figure 12A:
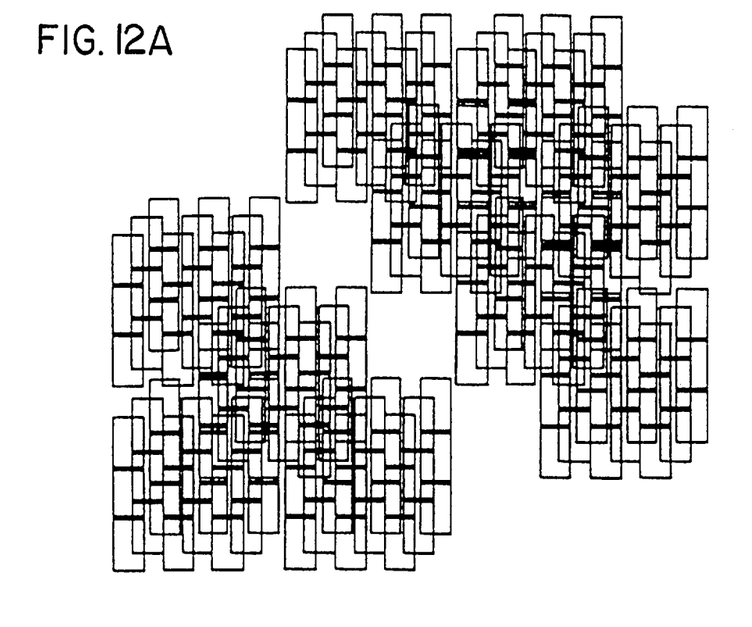
FIG. 12 shows a still further example of pixels disposed in a mosaic pattern and a pattern formed by diffracted pixels in two-dimensional directions.
Figure 12B:
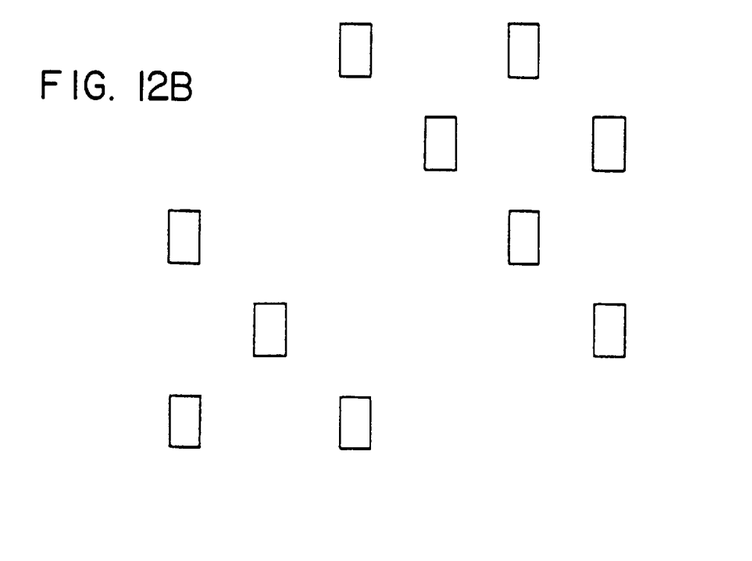

FIG. 12A shows another image pattern obtained by the other optical filter surface 30b with diffusion along another slanting (upper right to lower left) axis which is opposite from the example shown in FIGS. 11A and 11B. This image pattern suggests a characteristic to the edges of display pixels, which are arranged upper right to lower left under the condition of pixel diffusion in FIG. 12A. In other words, there is a difference in their resolution between the edges arranged upper right to lower left and upper left to lower right. FIG. 12B also shows the original pixel pattern.

Which pixel diffusion should be adopted can be determined by the total evaluation. The evaluation includes how difficult it is to recognize the grid, which has the better resolution, and whether the moire beat is deleted and so on after the diffusion.

As explained above, according to an exemplary embodiment for example, a diffraction grating for three (3) pixel diffusions can be formed on the first surface of the optical filter 30 and a refracting element such as prism for two (2) pixel diffusions can be formed on the opposite second surface. By forming this, the six (6) pixel diffusions shown in FIG. 7F and the thirty six (6×6=36) pixel diffusions shown in FIG. 10 can be easily obtained, having the most appropriate numbers of pixels after diffusion with the desired luminance level ratio.

It is also possible that the optical filter surface for diffusion along the perpendicular X and Y axes directions is formed on the same plane (such as the optical filter surface 30a), and the other optical filter surface for diffusion along the third axis other than X and Y axes is formed on the opposite surface (such as the optical filter surface 30b). Thus, the optical filter for diffusion can be realized along the multiple axes.

The above example performs the pixel diffusion by utilizing the two optical filter surfaces formed on the first and second surfaces facing each other on a single transparent plate. However, of course, more than three optical surfaces can be utilized.

In accordance with this invention, the number of pixel diffusions can be freely increased to the most appropriate number of pixel diffusions by utilizing a plurality of optical filter surfaces. The grid on outline between pixels can be effectively eliminated and make it difficult to recognize the repeated pixel dots with the same color.

Since both sides of a transparent plate, such as glass, can be used as two optical filter surfaces, the diffuser itself can be formed with one half of the number of the optical filter surfaces.

Further, the pixel diffusions along more than three different directions can be easily realized by combining a plurality of optical filter surfaces so that the configuration can be improved regarding the image edges by shifted pixels. For example, when using two optical filter surfaces, the orthogonal axes for pixel diffusions can be formed on the first optical filter surface and the slanting axis for further pixel diffusion can be also formed on the second optical filter surface. Therefore, the configuration of edges can be varied and the moire beat can be eliminated so that the freedom for designing can be increased.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A picture display apparatus comprising:

a display device having a plurality of light-emitting pixels arranged in a mosaic pattern; and a first and at least a second optical filter surface between said display device and a viewer, the first optical filter surface optically shifting the light-emitted by each pixel into a plurality of position-shifted pixel images by refraction and the second optical filter surface optically shifting each of the plurality of position-shifted pixel images of the first optical filter surface into a further plurality of position-shifted pixel images by refraction.

2. A picture display apparatus comprising:

a display device having a plurality of light-emitting pixels arranged in a mosaic pattern; and a first and at least a second optical filter surface between said display device and a viewer, the first optical filter surface optically shifting the light-emitted by each pixel into a plurality of position-shifted pixel images by refraction and the second optical filter surface optically shifting each of the plurality of position-shifted pixel images of the first optical filter surface into a further plurality of position-shifted pixel images by diffraction.

3. A picture display apparatus comprising:

a display device having a plurality of light-emitting pixels arranged in a mosaic pattern; and a first and at least a second optical filter surface between said display device and a viewer, the first optical filter surface optically shifting the light-emitted by each pixel into a plurality of position-shifted pixel images by diffraction and the second optical filter surface optically shifting each of the plurality of position-shifted pixel images of the first optical filter surface into a further plurality of position-shifted pixel images by refraction.

* * * * *